United States Patent

Weigel et al.

[11] Patent Number: 6,054,221
[45] Date of Patent: Apr. 25, 2000

[54] CURABLE EPOXY RESIN COMPOSITIONS, ON RELEASE LINERS WITH 9,9-BIS4-AMINOPHENYL) FLUORENES AS CURATIVES

[75] Inventors: Mark D. Weigel, Vadnais Heights; Steven C. Hackett, St. Paul; Timothy J. Clemens, Maplewood, all of Minn.

[73] Assignee: 3M Innovative Properties Company, St. Paul, Minn.

[21] Appl. No.: 09/418,913

[22] Filed: Oct. 15, 1999

Related U.S. Application Data

[62] Division of application No. 08/995,299, Dec. 22, 1997, Pat. No. 6,007,917, which is a division of application No. 08/532,941, Sep. 22, 1995, Pat. No. 5,728,755.

[51] Int. Cl.[7] .................. B32B 27/38; C08G 59/50; C08L 63/02
[52] U.S. Cl. .................. 428/413; 523/457; 523/466; 525/113; 528/97; 528/124
[58] Field of Search .................. 428/413; 523/457, 523/466; 528/97, 124; 525/113

[56] References Cited

U.S. PATENT DOCUMENTS

| | | |
|---|---|---|
| 3,459,713 | 8/1969 | Saran et al. . |
| 3,825,506 | 7/1974 | Carter . |
| 4,684,678 | 8/1987 | Schultz et al. . |
| 4,769,399 | 9/1988 | Schenz . |
| 4,882,370 | 11/1989 | Jordan et al. . |
| 5,276,106 | 1/1994 | Portelli et al. . |
| 5,369,192 | 11/1994 | Ko et al. . |
| 5,648,407 | 7/1997 | Goetz et al. . |
| 5,672,311 | 9/1997 | May et al. . |

FOREIGN PATENT DOCUMENTS

| | | |
|---|---|---|
| 0 203 828 | 12/1986 | European Pat. Off. . |
| 95/05411 | 2/1995 | WIPO . |

OTHER PUBLICATIONS

Chemical Abstracts, vol. 88, No. 2, Jan. 9, 1978, Columbus Ohio, U.S.; Abstract No. 7984, L. CSILLAG, E.A.: "Highly reactive, storeage stable epoxy resin composition" XP002019353 see abstract & HU,A, 13 436 (Villamosipari Kutato Intexet) Jun. 28, 1977.

"Low Flammability Epoxy Polymers Via 9,9–Bis(4,4'–aminophenyl)fluorene", Holloway, Aug. 1984.

M.L. Miller, "The Structure of Polymers," Reinhold Publishing Corp., New York, NY, pp. 290–291 (1966).

*Primary Examiner*—Donald R. Wilson

[57] ABSTRACT

Curable epoxy resin compositions, preferably solvent-free, wherein a fluorene amine curative is partially melt dissolved and partially dispersed as a solid in at least one aromatic polyepoxide. The compositions provide prepregs which exhibit tack with surprisingly good shelf life properties. Cured composites comprising the prepregs are also provided. The cured composites exhibit little resin migration and glass transition temperatures that are comparable to those of cured neat resins.

14 Claims, No Drawings

CURABLE EPOXY RESIN COMPOSITIONS, ON RELEASE LINERS WITH 9,9-BIS4-AMINOPHENYL) FLUORENES AS CURATIVES

This is a division of application Ser. No. 08/995,299 filed Dec. 22, 1997, U.S. Pat. No. 6,007,917 which is a division of application Ser. No. 08/532,941, filed Sep. 22, 1995, now U.S. Pat. No. 5,728,255 which are incorporated herein by reference.

FIELD OF THE INVENTION

This invention relates generally to epoxy resin compositions, prepregs, cured composites, and methods of making the same. More specifically, this invention relates to a curable epoxy resin composition prepared from an aromatic polyepoxide and a fluorene amine curative. The fluorene amine curative is partly melt-dissolved and partly dispersed as a solid in the aromatic polyepoxide. Preferably, the curable epoxy resin composition is solvent-free. Prepregs prepared from the curable epoxy resin composition advantageously exhibit tack in a curable state, with surprisingly good shelf life properties. Furthermore, composites prepared from prepregs of the invention advantageously cure uniformly with minimal resin migration and exhibit glass transition temperatures (Tgs) comparable to those of the corresponding cured neat resins.

BACKGROUND OF THE INVENTION

Fiber reinforced composites are rapidly emerging as a primary material for use in high performance applications such as manufacture-of aircraft components. Fiber reinforced composites provide structural efficiency at lower densities compared to metallic structures, allowing for the manufacture of light weight, high strength components. Fiber reinforced composites may be prepared using a variety of techniques, for example, hand or automated layup of prepreg, filament winding, compression molding and resin transfer molding. Of these techniques, hand or automated layup of prepreg is most common.

A prepreg comprises a fiber reinforcement impregnated with an uncured or partially cured resin matrix. Prepregs are available in a variety of forms depending on the configuration of the fiber reinforcement. For example, when the fiber reinforcement comprises a fiber bundle (or tow), the prepreg is specifically referred to as a "towpreg". By way of another example, when the fiber reinforcement comprises a collimated series of fiber bundles, the prepreg is specifically referred to as "prepreg tape".

Prepregs are typically supplied to part fabricators who convert the material into cured composite components using heat and pressure to cure the resin. For example, when the prepreg is in the form of a tape, the part fabricator cuts lengths of the tape and places them on a tool surface in the desired ply orientation. This operation can be done manually or automatically and is generally referred to as "layup". When the tool has a complex or curved or vertical configuration, the prepreg preferably has good tack to hold the plies together and to the tool until layup is complete. The prepreg also preferably has good drape or conformability, allowing it to conform to the tool shape. Preferably, the prepreg cures uniformly to provide composite parts having high glass transition temperatures. This allows the cured composite to withstand a variety of stresses (such as elevated temperatures, mechanical stresses, exposure to solvents, etc.) without loss of structural integrity.

Epoxy resin compositions can be used as the resin matrix for prepregs. Several references describe epoxy resin compositions comprising fluorene amine curatives. U.S. Pat. No. 5,276,106 (Portelli et al.) describes a thermosettable epoxy resin composition prepared by dispersion of thermoplastic particles, curatives, hardeners, catalysts, and modifying additives into the epoxy resin at a temperature at which the thermosettable resin is liquid, generally at about 30° C. to 60° C. U.S. Pat. No. 4,684,678 (Schultz et al.) describes a thermally curable epoxy resin composition prepared by mixing aromatic polyepoxides and curing agent or agents and/or catalysts to form a substantially uniform mixture. WO 95/05411 (Hardy et al.) describes a thermally curable aromatic amine-epoxy composition prepared by combining a polyepoxy, a polyamine, and a cure accelerator with mixing until the solids are uniformly distributed.

While these compositions have proven useful for a variety of applications, a need still exists for an epoxy resin composition comprising fluorene amine curative that can be used to provide prepreg having tack, suitable viscosity characteristics even after aging, and which uniformly cures to provide cured composites that exhibit glass transition temperatures comparable to those of the corresponding cured neat resins (i.e., resins prepared without fiber reinforcement). Preferably, such an epoxy resin composition is solvent-free for environmental reasons and to preclude the presence of residuals which can cause porosity during cure, possibly resulting in reduced performance characteristics.

SUMMARY OF THE INVENTION

The present invention provides a curable epoxy resin composition comprising at least one aromatic polyepoxide and at least one fluorene amine curative. Preferably, the curable epoxy resin composition is solvent-free. A portion of the fluorene amine curative is melt dissolved in the aromatic polyepoxide, while the remainder is dispersed as a solid in the aromatic polyepoxide. As used herein, the term "melt dissolved" means that the fluorene amine curative and aromatic polyepoxide are heated sufficiently so that the fluorene amine curative dissolves to give a homogenous, single phase resin. As used herein, the term "dispersed" means that the fluorene amine curative is present in the aromatic polyepoxide as a dispersed, undissolved solid such as a powder.

The present invention also provides a prepreg comprising a fiber reinforcement impregnated with the curable epoxy resin composition described above. Prepregs comprising epoxy resin compositions having both melt dissolved and dispersed fluorene amine curative advantageously provide tack at room temperature (21–25° C.). Tackiness was qualitatively evaluated using the procedure described in the examples. Briefly, two pieces of prepreg were overlapped with the application of pressure, and the resistance to separation was qualitatively assessed.

In addition to providing tack, prepregs of the invention surprisingly provide excellent shelf life properties despite the expectation that the presence of melt dissolved fluorene amine curative would, over time, cause the epoxy resin to prematurely advance, resulting in an increase in resin viscosity. For purposes of the present invention, shelf life was evaluated by comparing the viscosity profile as a function of temperature of a newly prepared epoxy resin composition against that of a room temperature (21–25° C.) aged composition. Preferably, the viscosity profile showed little change with aging. More preferably, the minimum viscosity of the viscosity profile remained in the range of 0.3 to 30 poise for the aged composition. This allows for the provision of a prepreg which can be layed up on a tool and allowed to sit at room temperature for a length of time (for example, 60 days) prior to cure without the need for special storage conditions.

Preferably, a sufficient amount of the fluorene amine curative is melt dissolved to provide a prepreg that is tacky at room temperature, i.e., has an initial resin glass transition temperature (Tg) less than or equal to 15° C. More preferably, the prepreg has an initial resin Tg in the range of from −5° C. to 10° C., most preferably in the range of from 0° C. to 10° C. It is also preferred that the amount of fluorene amine curative that is melt dissolved be sufficient to provide uniform cure without visible signs of resin migration. Resin migration occurs when the dispersed fluorene amine solid becomes trapped or filtered out by the fiber reinforcement to such an extent that the cure stoichiometry is disrupted, thereby causing portions of the composition to insufficiently cure. The insufficiently cured portions of the composition can migrate to the surface of the cured composite upon exposure to temperatures greater than the Tg of the cured composite. Cured composites which exhibit resin migration are believed to have less structural integrity for high performance applications (i.e., applications where the composite is exposed to elevated temperatures) and to be more susceptible to attack by solvents.

At the same time, the amount of melt-dissolved fluorene amine curative is preferably not so large that the prepreg becomes brittle, loses tack properties, and can no longer be used in most prepreg applications where the prepreg must conform to the shape of a tool fixture or mandrel.

Within the broad considerations given above, the amount of fluorene amine curative that is melt dissolved with the aromatic polyepoxide is preferably in the range of from 10 to 90 percent by weight based on the total amount of fluorene amine curative. More preferred ranges depend on the selection of the particular aromatic polyepoxide but generally are in the range of from 30 to 80 percent by weight, most preferably in the range of from 40 to 70 percent by weight. The remaining amount of fluorene amine curative is dispersed in the aromatic polyepoxide in solid form, preferably as a powder.

The present invention also provides a method of making a prepreg comprising the steps of providing at least one aromatic polyepoxide; providing at least one fluorene amine curative; melt dissolving a portion of the fluorene amine curative into the aromatic polyepoxide; dispersing the remaining portion of the fluorene amine curative into the aromatic polyepoxide to form a resin matrix; providing a fiber reinforcement; and impregnating the fiber reinforcement with the resin matrix.

The present invention further provides cured composites prepared from prepregs of the invention. The cured composites of the invention advantageously exhibit uniform cure and Tgs that are comparable to (i.e., within ten degrees C. of) those of the corresponding cured neat resins. As used herein, the term "corresponding cured neat resin" means the same cured resin prepared without reinforcement. The cured composites can be used as structural and non-structural aircraft components, space structures, pressure vessels, tanks, pipes, composites for electronics such as circuit boards, and automotive body and engine parts, and the like.

DETAILED DESCRIPTION OF THE INVENTION

The curable epoxy resin composition of the invention comprises at least one aromatic polyepoxide and at least one fluorene amine curative. Preferably, the curable epoxy resin composition is solvent-free. A portion of the fluorene amine curative is melt dissolved in the aromatic polyepoxide, while the remainder is dispersed as a solid in the aromatic polyepoxide. The prepreg of the invention comprises a fiber reinforcement impregnated with the curable epoxy resin composition. We turn now to a discussion of aromatic polyepoxides, fluorene amine curatives, and fiber reinforcements suitable for use in the present invention.

Aromatic Polyepoxide

Polyepoxides are compounds comprising at least two 1,2-epoxide groups, i.e., groups having the structure:

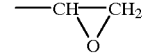

Aromatic polyepoxides are desired because they can impart high temperature performance properties (e.g., a high glass transition temperature) to the cured composite and can impart structural properties thereto.

Aromatic polyepoxides suitable for use in the prepreg of the invention include polyglycidyl ethers of polyhydric phenols, for example, pyrocatechol, resorcinol; hydroquinone; 4,4'-dihydroxy-3,3'-dimethyldiphenyl methane; 4,4'-dihydroxydiphenyl methane; 1,1-bis(4-hydroxyphenyl) ethane; 1,2-bis(4-hydroxyphenyl)ethane; 2,2-bis(4-hydroxyphenyl)propane; 4,4'-dihydroxydiphenyl cyclohexane; 2,2-bis(3-methyl-4-hydroxyphenyl)propane; 4,4'-dihydroxydiphenyl sulfone; tris-(4-hydroxyphenyl) methane; 9,9-bis(4-hydroxyphenyl)fluorene and ortho-substituted analogues thereof, such as those disclosed in U.S. Pat. No. 4,707,534. Suitable aromatic polyepoxides also include the polyglycidyl ethers of the halogenation (e.g., chlorination and bromination) products of the above-mentioned polyhydric phenols.

Other suitable aromatic polyepoxides include the polyglycidyl derivatives of aromatic amines (i.e., glycidylamines) obtained from the reaction between the aromatic amines and an epihalohydrin. Examples of such glycidylamines include N,N-diglycidyl aniline; N,N,N',N'-tetraglycidyl-4,4'-diaminodiphenyl methane; N,N-diglycidylnapthalenamine (given the name of N-1 napthalenyl-N-(oxiranylmethyl) oxiranemethanamine by Chemical Abstracts 9th Con. 8505F (1979–1982)); N,N,N'N'-tetraglycidyl-1,4-bis[α-(4-aminophenyl)-α-methylethyl]benzene; and N,N,N',N'-tetraglycidyl-1,4-bis[α-(4-amino-3,5-dimethylphenyl)-α-methylethyl]benzene. The polyglycidyl derivatives of aromatic aminophenols (e.g., glycidylamino-glycidyloxy benzene), as described in U.S. Pat. No. 2,951,825, are also suitable. An example of these compounds is N,N-diglycidyl-4-glycidyloxybenzenamine.

Polyglycidyl esters of aromatic polycarboxylic acids, for example, the diglycidyl esters of phthalic acid, isophthalic acid, or terephthalic acid, are also useful.

Preferred aromatic polyepoxides include the polyglycidyl ethers of 4,4'-dihydroxydiphenyl methane (bisphenol F), 2,2-bis(4-hydroxyphenyl)propane (bisphenol A), and 9,9-bis (4-hydroxyphenyl)fluorene.

Examples of commercially available aromatic polyepoxides include the Araldite™ series of materials such as MY-720, 721, 722, 0510, and 0500, and PY-306 and 307 (all available from Ciba-Geigy, Inc., Hawthorne, N.Y.); the EPON™ series of materials such as DPL-862 and HPT-1079 (Shell Chemical Co., Houston, Tex.); and the D.E.R.™, D.E.N.™, and QUATRE™ families of materials (Dow Chemical Co., Midland, Mich.).

While solid aromatic polyepoxide resins may be used, it is preferred that the polyepoxide or mixture of polyepoxides be essentially liquid at room temperature, by which it is meant that the viscosity of the polyepoxide (or polyepoxide mixture) permits mixing and then spreading (e.g., coating) at room temperature, or upon gentle warming to a temperature that does not risk premature reaction of the curative (e.g., room temperature to about 110° C.). Liquid aromatic polyepoxides facilitate mixing and spreading or coating of the resin composition at low temperatures that do not activate the curative.

Preferably the aromatic polyepoxide (or polyepoxide mixture) has an average epoxide functionality of two to four, and, more preferably, an average epoxide functionality of two to three. This facilitates providing both an epoxy resin composition that can be mixed and coated without premature reaction of the heat-activated curative, and a final cured composite that is sufficiently crosslinked. It is also preferred that the aromatic polyepoxide (or polyepoxide mixture) have an average epoxy equivalent weight of about 80 to 200 grams per equivalent. This promotes the formation of epoxy resin compositions having a viscosity that permits efficient mixing and coating, and a final cured composite with an acceptably high glass transition temperature.

Fluorene Amine Curative

The curing agent comprises at least one 9,9-bis (aminophenyl)fluorene, the phenyl and fluorene groups of which can be unsubstituted or substituted by one or more atoms or groups that are inert to reaction with an epoxide group. Preferably, the fluorene amine curing agent has the following formula:

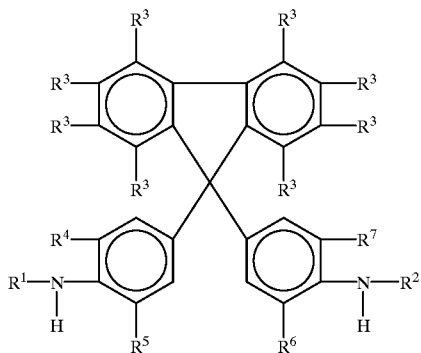

Each $R^3$ is independently selected from hydrogen and groups that are inert to the polymerization of epoxide group-containing compounds. Preferably $R^3$ is hydrogen, a halogen, a linear or branched alkyl group havinig 1 to 6 carbon atoms, an aromatic group, a nitro group, an acetyl group, or a trimethylsilyl group. $R^1$ and $R^2$ are independently selected from hydrogen and linear and branched alkyl groups having 1 to 6 carbon atoms. Each $R^4$, $R^5$, $R^6$ and $R^7$ is independently selected from hydrogen, aromatic groups, the halogens, and linear and branched alkyl groups having 1 to 6 carbon atoms.

Examples of curing agents that satisfy the above general formula are:

9,9-bis(4-aminophenyl)fluorene,
4-methyl-9,9-bis(4-aminophenyl)fluorene,
4-chloro-9,9-bis(4-aminophenyl)fluorene,
2-ethyl-9,9-bis(4-aminophenyl)fluorene,
2-iodo-9,9-bis(4-aminophenyl)fluorene,
3-bromo-9,9-bis(4-aminophenyl)fluorene,
9-(4-methylaminophenyl)-9-(4-ethylaminophenyl) fluorene,
1-chloro-9,9-bis(4-aminophenyl)fluorene,
2-methyl-9,9-bis(4-aminophenyl)fluorene,
2-fluoro-9,9-bis(4-aminophenyl)fluorene,
1,2,3,4,5,6,7,8-octafluoro-9,9-bis(4-aminophenyl) fluorene,
2,7-dinitro-9,9-bis(4-aminophenyl)fluorene,
2-chloro-4-methyl-9,9-bis(4-aminophenyl)fluorene,
2,7-dichloro-9,9-bis(4-aminophenyl)fluorene,
2-acetyl-9,9-bis(4-aminophenyl)fluorene,
2-methyl-9,9-bis(4-methylaminophenyl)fluorene,
2-chloro-9,9-bis(4-ethylaminophenyl)fluorene, and
2-t-butyl-9,9-bis(4-methylaminophenyl)fluorene.

In more preferred fluorene amine curing agents, $R^1$, $R^2$, $R^3$, $R^4$, $R^5$, $R^6$ and $R^7$ are all as defined above, with the proviso that at least one of $R^1$ and $R^2$ is a linear or branched alkyl group having 1 to 6 carbon atoms. Examples of such curing agents include:

9,9-bis(4-methylaminophenyl)fluorene,
9-(4-methylaminophenyl)-9-(4-aminophenyl)fluorene,
9,9-bis(4-ethylaminophenyl)fluorene,
9-(4-ethylaminophenyl)-9-(4-aminophenyl)fluorene,
9,9-bis(4-propylaminophenyl)fluorene,
9,9-bis(4-isopropylaminophenyl)fluorene,
9, 9-bis(4-butylaminophenyl)fluorene,
9,9-bis(3-methyl-4-methylaminophenyl)fluorene,
9,9-bis(3-chloro-4-methylaminophenyl)fluorene,
9-(4-methylaminophenyl)-9-(4-ethylaminophenyl) fluorene,
9,9-bis(3,5-dimethyl4-methylaminophenyl)fluorene,
9-(3,5-dimethyl-4-methylaminophenyl)-9-(4-methylaminophenyl)fluorene,
1,5-dimethyl-9,9-bis(3,5-dimethyl-4-methylaminophenyl)fluorene
4-methyl-9,9-bis(4-methylaminophenyl)fluorene,
4-chloro-9,9-bis(4-methylaminophenyl)fluorene, and
9,9-bis(3,5-diethyl-4-methylaminophenyl)fluorene.

In the most preferred fluorene amine curing agents $R^3$ is as defined above, $R^1$ and $R^2$ are both hydrogen, and $R^4$, $R^5$, $R^6$ and $R^7$ are independently selected from hydrogen, the halogens, aromatic groups, and linear and branched alkyl groups having 1 to 6 carbon atoms but with the further provisos that at least one of the $R^4$ and $R^5$ moieties and at least one of the $R^6$ and $R^7$ moieties are linear or branched alkyl groups having 1 to 6 carbon atoms, halogens, or an aromatic group.

Examples of the most preferred curing agents include:
9,9-bis(3-methyl-4-aminophenyl)fluorene,
9,9-bis(3-ethyl-4-aminophenyl)fluorene,
9,9-bis(3-phenyl-4-aminophenyl)fluorene,
9,9-bis(3,5-dimethyl-4-aminophenyl)fluorene,
9-(3,5-diethyl-4-aminophenyl)-9-(3-methyl-4-aminophenyl)fluorene,
9-(3-methyl-4-aminophenyl)-9-(3-chloro-4-aminophenyl)fluorene,
9,9-bis(3,5-diisopropyl-4-aminophenyl)fluorene, and
9,9-bis(3-chloro-4-aminophenyl)fluorene.

Preferred curatives also exhibit latent thermal reactivity, that is, they react primarily at higher temperatures (preferably temperatures of at least 150° C.). This allows the epoxy resin composition to be readily mixed and coated at room temperature (about 21–25° C.) or with gentle warming without premature reaction of the curative.

The curative is employed in an amount that is effective for providing the desired high temperature performance properties in the cured composite. The actual amount of curative employed will also be influenced by the types and amounts of other components in the mixture. The fluorene amine curative is typically present in an amount sufficient to provide 1.0 to 2.0 moles of amino-hydrogen groups (NH) per mole of epoxide groups. More preferably, the fluorene amine curative is present in an amount sufficient to provide 1.2 to 1.65 moles NH groups per mole of epoxide groups. When the amount of curative falls significantly outside of these ranges, the final cured composite may have a low glass transition temperature, a high coefficient of thermal expansion, reduced solvent resistance, may absorb too much moisture, or may be brittle.

The fluorene amine curing agent can be supplemented with conventional epoxy resin curing agents. Included among such supplementary curing agents are aliphatic and aromatic primary and secondary amines, for example,4,4'-diaminodiphenyl sulfone, 4,4'-diaminodiphenyl ether, and 2,2-bis(4-aminophenyl)propane; aliphatic and aromatic tertiary amines such as dimethylaminopropylamine and pyridine; imidazoles such as 2-ethyl-4-methylimidazole; hydrazides such as adipodihydrazide; guanidines such as tetramethyl guanidine and dicyandiamide; and benzyldimethyl amine.

Also useful as supplementary curing agents are Lewis acids such as aluminum chloride, aluminum bromide, boron trifluoride, antimony pentafluoride, phosphorous pentafluoride, titanium tetrafluoride and the like. It is also desirable at times that these Lewis acids be blocked to increase the latency of compositions containing them. Representative of blocked Lewis acids are boron trifluoride complexes such as $BF_3$-diethylether, $BF_3$-monoethanolamine, $BF_3$-monoethylamine; and adducts of $HSbF_5X$ with either aniline-functional materials or a hindered amine, X being OH, halogen, or $OR^8$ ($R^8$ being an aliphatic or an aromatic group).

In addition, catalysts such as those described in WO 95/05411 may be used.

Fiber Reinforcement

The purpose of the fiber reinforcement is to provide strength to the cured composite. The fibers of the fiber reinforcement can comprise a variety of different materials including glass fibers, carbon fibers, polyamide fibers such as poly(p-phenylene terephthalamide) fibers (for example, Kevlar™ fiber available from E.I. duPont de Nemours and Co., Inc., Wilmingtom, Del.) and ceramic fibers. Carbon fibers are typically used as the reinforcing fiber in advanced aerospace structural composites.

The fiber reinforcement may comprise a variety of configurations. For example, the fiber reinforcement may comprise a woven structure constructed by interlacing yarns, fibers or filaments to form patterns such as plain, harness satin or leno weaves. Alternatively, the fiber reinforcement may comprise a nonwoven structure or planar textile structure produced by loosely compressing together fibers, yarns, and the like. The fiber reinforcement may also comprise a tow (i.e., an untwisted bundle of continuous fibers) or a roving (i.e., a number of yarns, strands, tows or ends collected into a parallel bundle with little or no twist).

The fibers of the reinforcement may be unsized or coated with sizing. Preferably, the fibers are unsized. When a sizing is used, however, it preferably does not materially affect the performance of the ultimate prepreg or cured composite, for example, by causing a substantial reduction in Tg.

Epoxy Resin Composition

The curable epoxy resin composition can be prepared by melt dissolving a portion of the fluorene amine curative with some or all of the aromatic polyepoxide to form a homogenous, single phase blend. This can be done using, for example, an extruder or a heated mixer. Typically during this step, the epoxy resin composition is heated to about 149° C. (300° F.) for a time sufficient to allow dissolution (usually about fifteen minutes), but not so long that substantial curing of the epoxy resin composition can occur.

The homogenous, single phase blend is then typically cooled slowly or by quench cooling, and the remaining polyepoxide (if any) and adjuvants are then usually added. The remaining portion of fluorene amine curative is then dispersed in the form of a solid, preferably as a powder, typically at temperatures less than about 49° C. (120° F.) using a high shear mixer or extruder.

As a variation of the above procedure, it is possible to melt dissolve a portion of the fluorene amine curative in a first fraction of aromatic polyepoxide while uniformly dispersing the remaining fluorene amine curative in a second fraction of aromatic polyepoxide, ultimately bringing the first and second fractions together to form a uniform resin composition.

A single extruder having multiple zones can be used to melt dissolve and disperse the curative into the aromatic polyepoxide.

Preferably, a sufficient amount of the fluorene amine curative is melt dissolved to provide a prepreg that is tacky at room temperature, i.e., has an initial Tg less than about 15° C. More preferably, the prepreg has an initial Tg in the range of from −5° C. to 10° C., most preferably between 0° C. and 10° C. It is also preferred that the amount of fluorene amine curative that is melt dissolved be sufficient to avoid resin migration of insufficiently cured composition to the surface of the cured composite.

At the same time, it is preferred that the amount of melt-dissolved fluorene amine curative is not so large that the prepreg becomes brittle, loses tack, and can no longer be used in most prepreg applications where the prepreg must conform to the shape of a tool fixture or mandrel.

Within these parameters, the amount of fluorene amine curative that is melt dissolved with the epoxy is preferably in the range of from 10 to 90 percent by weight based on the total amount of fluorene amine curative. More preferred ranges depend on the selection of the particular aromatic polyepoxide but generally are in the range of from 30 to 80 percent by weight, most preferably in the range of from 40 to 70 percent by weight. The remaining amount of fluorene amine curative is dispersed in the aromatic polyepoxide in solid form.

Various adjuvants can also be added to the composition of the invention to alter the characteristics of the cured composition. Included among useful adjuvants are thixotropic agents such as fumed silica; pigments or dyes; fillers such as silica, magnesium sulfate, calcium sulfate, and beryllium aluminum silicate; flame retardants; thermally conductive particles; electrically conductive particles; tackifiers; clays such as bentonite; solid or hollow spheres comprising glass, ceramic or polymeric materials; and the like. Amounts of up to about 200 parts of adjuvant per 100 parts of epoxy resin compositions can be used. The adjuvants may be used alone or in combination.

Another adjuvant that may be used is a rubbery heterophase that is introduced into the epoxy resin composition. For a detailed discussion of the use of a rubbery heterophase in epoxy resins, see Advances in Chemistry Series, No. 208, titled "Rubber-Modified Thermoset Resins" edited by C. K. Riew and J. K. Gillham, American Chemical Society, Washington, 1984. Generally up to about 25 parts of rubbery phase per 100 parts of epoxy resin compositions can be used.

Another useful adjuvant is a flow control agent. The purpose of the flow control agent is to prevent loss of the resin due to flow during curing. Suitable flow control agents include thermoplastic resins, such as polycarbonate, polysulfone, polyarylate, polyethersulfone, polyarylsulfone, polyester, polyetherimide, polyamideimide, polyimide, polyamide, or polyether resin, present as fine particles or dissolved into the resin matrix. Thermoplastic flow control agents are typically present in an amount from 1 to 15 percent by weight based on the total weight of the resin composition.

Prepreg Preparation

The curable epoxy resin composition can be used to impregnate a variety of fiber reinforcements such as tows (i.e., bundles of fibers), or woven structures. Impregnation may be accomplished, for example, by heating the epoxy resin composition to temperatures at which it will flow (typically at a temperature of 110° C. or less) and depositing it onto the fiber reinforcement. It is also possible to provide, for example, a bath of flowing epoxy resin and immerse the fiber reinforcement (such as tow) in the bath. Impregnation of the fiber reinforcement may also be accomplished by forming a film of the epoxy resin composition on a release liner and subsequently transfer laminating the film to a fiber reinforcement using pressure and/or heat. Preferably, for this lamination process, the curable epoxy resin composition has a viscosity in the range of from 10 to 30 poise at temperatures less than 110° C. for ease of processing and to provide sufficient wet out of the fibers of the reinforcement without initiating resin cure. Alternatively, the fiber reinforcement may be placed on a tool and then impregnated with the resin composition by application of heat, pressure, and vacuum, or any combinations thereof. Methods for preparing prepregs employ solvent-free processing for environmental reasons and to preclude the presence of residual volatiles which can cause porosity during cure, possibly resulting in reduced performance characteristics.

Prepregs of the invention provide tack and surprisingly good shelf life properties. Tackiness was qualitatively evaluated using the procedure described in the examples. Briefly, two pieces of prepreg were overlapped with the application of pressure, and the resistance to separation was qualitatively assessed.

For purposes of the present invention, shelf life was evaluated by comparing the viscosity profile as a function of temperature of a newly prepared epoxy resin composition against that of a room temperature (21–25° C.) aged composition. Compositions were aged for up to 65 days. Preferably, the viscosity profile showed little change with aging. More preferably, the minimum viscosity of the viscosity profile remained in the range of 0.3 to 30 poise for the aged composition. This allows for the provision of a prepreg which can be layed up on a tool and allowed to sit at room temperature for a length of time (for example, 60 days) prior to cure without the need for special storage conditions. The prepreg is then cured using heat and pressure such as provided by autoclave or press curing.

Resin compositions of the invention may be used to provide cured composites using a variety of processes such as pultrusion, filament winding, automated fiber placement, resin transfer molding, continuous resin transfer molding (CRTM™), resin film infusion, automated tow placement, automated and manual tape lay-up, vacuum bag lamination, press lamination, roll lamination, and the like.

Cured composites of the invention advantageously exhibit little to no resin migration and Tgs that are comparable to the corresponding neat resins. These characteristics enable the cured composite to withstand a variety of stresses (such as elevated temperatures, mechanical stresses, exposure to solvents, etc.) without loss of structural integrity.

Objects and advantages of this invention are further illustrated by the following examples, but the particular materials and amounts thereof recited in these examples should not be construed to unduly limit this invention. In the examples, all parts and percents are by weight and temperatures are in degrees centigrade, unless otherwise noted.

EXAMPLES

GENERAL PREPARATION METHODS

General Preparation of Resin Compositions

The curable resin compositions were prepared by weighing the aromatic polyepoxide component(s) into a 1.9 liter (0.5 gallon) metal can and heating it to 149° C. (300° F.) using a hot plate while stirring with an overhead air stirrer fitted with a three-pronged mixing blade. A portion of the fluorene amine curative powder was added in a single charge with stirring at 149° C. (300° F.) until all the curative dissolved to give a homogenous, single phase liquid resin. This liquid resin was then charged (while still hot) into a planetary type mixer (commercially available as a Premier Mill Mixer from Premier Mill Corporation Temple, Pa.) which was at room temperature (approximately 21° C. (70° F.)). The polyepoxide/dissolved fluorene amine mixture was allowed to cool to 49° C. (120° F.) while stirring using a mixer speed setting of 3. The remaining amount of fluorene amine curative powder was then added in a single charge with stirring at 49° C. (120° F.) and application of a vacuum of 70 cm (27 inches) Hg. Mixing was continued under these conditions until all the powdered fluorene amine curative was uniformly dispersed as determined by the absence of visible "clumps" or agglomerates of powdered material.

General Preparation of Resin Transfer Films

Resin transfer films of the invention were prepared by coating the resin compositions onto a release liner having a width of 35.6 cm (14 inches). More specifically, the resin compositions were coated onto a 102 $\mu$m (0.004 inches) semi-bleached, silicone-coated paper release liner having a basis weight of 33 kg/279 m$^2$ (72 lb/3000 ft$^2$) (commercially available as "Stick-Not" from Release International, Chicago, Ill.) using a heated reverse three-roll coater. The resin composition was heated for 15 seconds in a 1200 Watt microwave oven (commercially available as Model Spacemaker 2 from General Electric Corp.) operated at its highest setting, removed, and briefly stirred by hand with a wood tongue depressor. The resin composition was heated in this manner four to six times to achieve a pourable viscosity for easy transfer; however, temperatures never exceeded 71° C. (160° F.). The gap between the two heated rollers was set at 127 $\mu$m (0.005 inches) using a feeler gauge, and the temperature of the two heated rollers was set at 71° C. (160° F.). The resin was coated to give a coating weight of 0.01047 g/cm$^2$ and a coating width of 33.0 cm (13 inches). The resulting coated resin transfer films were then covered with a polyethylene liner (commercially available as Product No. GF-10R from Consolidated Thermoplastic, Chippewa Falls, Wis.) which was 35.6 cm (14 inches) wide and 76 $\mu$m (0.003 inches) thick, and wound onto a 7.6 cm (3 inches) diameter cardboard core.

General Preparation of Prepreg

The coated resin transfer films were used to make resin-impregnated carbon fabric material, also referred to as "prepreg" material. More specifically, prepreg material was made from coated resin transfer films using a hot melt prepregger (commercially available from California Graphite Machines; Corona, Calif.). The polyethylene liners were removed from two rolls of a coated resin transfer film. The two exposed resin films were simultaneously laminated to opposite sides of a carbon fabric substrate comprising a fiber designated as G30-500-EPO1, having an 8 harness satin weave, and an a real weight of 370 g/m$^2$ (commercially available as Product No. G105, Celion 3K, from Textile Technologies, Inc., Hatboro, Pa.) using heated nip rolls. The nip rolls were operated using a temperature setting of 95° C. (203° F.) and a pressure of 17.5 kg/cm (98 lb/in). The line speed was 3 m/min (9.8 ft/min).

General Preparation of Cured Composites

The prepreg materials of the invention were used to make cured carbon fiber composites. More specifically, cured carbon fiber composites were made by placing one ply of carbon fabric prepreg, 15.2 cm×15.2 cm (6 inches×6 inches), on top of another, placing this two-ply layup on a vacuum table covered with a release liner, and applying a vacuum of 71 cm (28 inches) Hg at 25° C. (77° F.) for 5 minutes to remove air entrapped between the two plies and consolidate them. Two such two-ply layups were then placed one on another and consolidated as described above to give a four-ply layup. Finally, two such four-ply layups were placed one on another and consolidated as described above to give an eight-ply layup. The eight-ply layup was placed on the center of a metal plate [20 cm×20 cm×0.3 cm (8 inches×8 inches×0.12 inches)] which was wrapped with 0.01 cm (0.004 inches) thick Teflon™ release film (commercially available from Dewal Industries, Inc., Saunderstown, R.I.). Two 25 cm (10 inches) long glass fiber bleeder strings were then placed on the top surface of the eight-ply layup, each one 2.5 cm (1 inch) from opposite outer edges of the eight-ply layup. The bleeder strings extended beyond the layup by 5 cm (2 inches) on both ends. An adhesive-backed cork dam, 0.64 cm (0.25 inches) wide and 0.32 cm (0.13 inches) thick, was placed around the eight-ply layup and adhered to the bottom plate so that the bleeder strings extended over the cork ribbon. A second metal plate [15.2 cm×15.2 cm×0.16 cm (6 inches×6 inches× 0.06 inches)] wrapped with the same 0.01 cm (0.004 inches) thick Teflon™ release film described above was then placed on top of the eight-ply layup and rested inside the border created by the cork dam. The edges of the top metal plate were sealed with 50.8 mm (2 inch) wide 3M Scotchmark™ Polyester Composite Bonding Tape having a thickness of 0.005 cm (0.002 inches). The eight-ply layup was placed onto an autoclave tool, covered with a vacuum bag, and cured in an autoclave in a conventional manner. A vacuum of 76 cm (30 inches) Hg was applied for 15 minutes at 25° C. (77° F.). A pressure of 0.59 MPa (85 psi) was then applied. During the pressure rise, the vacuum was released when the pressure reached 0.28 MPa (40 psi). Upon reaching the final pressure, the temperature was raised to 177° C. (351° F.) at a rate of 2° C./minute (3.6° F./minute). The layup was cured at this temperature for four hours, after which the autoclave was internally cooled with a mixture of steam and cold tap water to 25° C. (77° F.) at a rate of 5C./minute (9° F./minute).

TEST METHODS

Initial Resin Glass Transition Temperature (Tg)

A Model 912 dual cell differential scanning calorimeter (DSC) equipped with a Thermal Analyst 2000 (both commercially available from TA Instruments, Inc., New Castle, Del.) was used to measure the Tg of the curable resin compositions. The calorimeter was calibrated at 156.6° C. using an Indium standard. About 4 to 12 milligrams of the curable resin composition was placed in a DSC pan sealed shut, and placed in the sample cell of the DSC. A sealed empty pan and lid was placed in the reference cell. The sample was cooled to −50° C. with liquid nitrogen, then scanned from −50° C. to 50° C. at a rate of 10° C./minute under a nitrogen purge. The Tg was taken as the midpoint of the observed transition. Reported values are rounded to the nearest whole degree. A Tg of less than or equal to 15° C. is desirable for providing prepreg materials with sufficient tack to facilitate the layup of complex parts by either hand or machine.

Prepreg Tack

Prepreg materials were evaluated for their tack characteristics by overlapping two pieces of fabric prepreg having dimensions of 7.6 cm (3 inches) in length and 2.5 cm (1 inch) in width to form an overlap region of 2.5 cm (1 inch) along the length of each material. A 160 gram rubber roller was rolled across the overlapping area four times to press the pieces together. This overlapping 2-ply layup was then pulled apart in the length direction (shear mode) using one hand on each non-overlapped end. The resistance to separation was qualitatively determined and assigned a relative rating on the following scale:

| | |
|---|---|
| Good | the two pieces stuck together and separated with significant resistance; |
| Slight | the two pieces stuck together and separated with some resistance; |
| Poor | the two pieces stuck together but separated with very little resistance; |
| None | the two pieces did not stick to each other at all. |

Prepregs rated "Good" or "Slight" are expected to be suitable for automated or hand layup of composite parts. Prepregs rated "Good" are expected to be especially suitable for automated processes, including those processes where composites having complex shapes (e.g., non-linear shapes) are desired. Prepregs rated "Poor" are expected to be suitable for hand layup only of parts. Prepregs rated "None" are expected to be unsuitable for automated processes or hand layup of composite parts having complex shapes, but probably could be used to provide hand layup of very simple, linear or flat parts.

Curable Resin Viscosity Minimum

A Rheometrics RDA-II Dynamic Mechanical Analyzer (commercially available from Rheometrics Inc., Piscataway, N.J.) was used in the parallel plate mode of operation to measure the minimum viscosity of the curable resin compositions. Three to five grams of curable resin composition were placed between the parallel plates (bottom plate diameter=50 millimeters, top plate diameter=40 millimeters). The resin was loaded at 25° C. (77° F.) for Examples 1–4, 9–11 and Comparative Examples C1 and C4; at 40° C. (104° F.) for Examples 5, 6 and 12; and at 50° C. (122° F.) for Examples 7, 8 and 13 and Comparative Examples C2 and C3. The plates were then closed to provide a 1.0 millimeter gap filled with resin. Excess resin was scraped from the edges with a razor blade. Each sample was equilibrated for fifteen minutes by applying a torque frequency of 100 radians/second and a strain of 10% at a temperature of 32° C. (90° F.). Each sample was then heated at 2° C./minute (3.6° F./min) to 179° C. (354° F.) and held at that temperature until a viscosity increase was observed. The viscosity was recorded every minute on a dual-y axis plot as a function of temperature. The left y-axis of the plot provided viscosity in poise; the right y-axis of the plot provided temperature, and the x-axis provided time. The minimum viscosity (i.e., the lowest viscosity point of the profile) was recorded. Preferably, the minimum viscosity of the viscosity profile remained in the range of 0.3 to 30 poise for the aged composition. This allows for the provision of prepreg which can be layed up on a tool and allowed to sit at room temperature for a length of time prior to cure to form a cured composite without the need for special storage conditions.

Cured Composite Laminate Glass Transition Temperature (Tg)

The Tg of the cured composite laminates was measured by dynamical mechanical analysis using the same Rheometrics RDA-II Dynamic Mechanical Analyzer described above. A rectangular sample measuring about 1.3 cm in width by about 5.1 cm in length by about 0.16 to 0.48 cm in thickness (0.5×2.0×(0.06–0.19) inches)) was cut from the cured composite and placed between the upper and lower grips of the analyzer. The analyzer was equipped with an oven that heated the sample from 50° C. (122° F.) to 220° C. (428° F.) in 5° C. steps. The sample was held at the desired temperature for one minute before recording data. A sinusoidal torque with a frequency of 10 radians/second was applied to the lower grip, which, in turn, applied a strain to the sample. The resultant stress was monitored by the upper grip and was recorded every 5° C. The recorded data was used to calculate both storage modulus (G') and loss modulus (G"), with the onset of the observed transition, i.e., the inflection point, of G' taken as the Tg. Reported values are rounded to the nearest whole degree.

Cured Neat Resin Glass Transition Temperature (Tg)

The Tg of a cured neat resin was measured by dynamical mechanical analysis using the same Rheometrics RDA-II Dynamic Mechanical Analyzer described above. Two aluminum plates [15.2 cm in length by 11.4 cm in width (6×4.5 inches)] were cleaned with a ScotchBrite™ pad (available from 3M Co. St. Paul, Minn.) saturated methyl ethyl ketone (MEK) followed by a MEK wipe. The plates were then wiped with RAM 225 mold release agent (available from Lilly-Ram Industries, Alexandria, Ohio). The plates were used to prepare a mold by clamping a Teflon™ spacer [0.3 cm (⅛ inches) thick] between the two plates. The Teflon™ spacer was present on three sides of the assembly, providing a 2.5 cm (1 inch) border of Teflon™. This entire assembly was placed in an oven at 177° C. (350° F.) for 30 minutes to cure the RAM 225 mold release.

50 g of the resin was placed in a 0.2 liter (0.5 pint) metal can and stirred at 149° C. (300° F.) until the resin changed from opaque to clear. The can was then placed in a vacuum oven heated to 121° C. (250° F.). A vacuum of 71 cm (28 inches) Hg was applied until the air was removed from the resin as demonstrated by the cessation of bubbling and foaming. The resin was then poured into the hot mold and cured in an oven for 4 hours at 177° C. (350° F.). The mold assembly was removed from the oven and allowed to cool before the cured resin was removed from the mold. This cured neat resin was then tested for Tg using the procedure described above for a cured composite laminate.

Resin Migration in Cured Composite

After measurement of the cured composite Tg, as described above, the samples were visually examined for the presence of "shiny" spots which are believed to be indicative of resin migration. A relative rating was assigned as follows:

None no shiny spots were observed on either the surface or cut edges;

Low shiny spots were observed only on the surface; and

High shiny spots were observed on both the surface and cut edges.

Those samples given a "None" rating are expected to be especially useful as cured composites for structural applications in the aerospace industry. Samples given a "Low" rating are expected to be suitable for use as cured composites for other, less demanding applications such as non-structural aircraft components, pressure vessels, tanks, pipes, composites for electronics such as circuit boards, and automotive body and engine parts, and the like. Cured composites given a "High" rating are less desirable as these composites are believed to have less structural integrity and be more susceptible to attack by solvents.

GLOSSARY

Various abbreviations are used in the following examples. The abbreviations are defined according to the following schedule:

CAF—9,9-bis(3-chloro-4-aminophenyl)fluorene

FEP—the diglycidyl ether of 9,9-bis(4-hydroxyphenyl) fluorene (available as EPON™ HPT 1079 from Shell Chemical Co., Houston, Tex.)

D.E.R.™ 332—diglycidyl ether of bisphenol A (available from Dow Chemical Co., Midland, Mich.)

EPON™ DPL-862—diglycidyl ether of bisphenol F (available from Shell Chemical Co.)

Examples 1–8

A series of curable resin compositions, resin transfer films, prepregs, and cured composites were prepared using the types and amounts of curative and polyepoxide as shown in Table 1 and the methods described above in "General Preparation Methods", except that in Examples 2, 4, 6, and 8, a 0.2 liter (0.5 pint) metal can was used to carry out the dissolution of the fluorene amine curative powder and only resin compositions were prepared. Samples were tested using the procedures described above. Test results are provided in Table 1.

Example 9

A curable resin composition, resin transfer film, prepreg, and cured composite were prepared using the types and amounts of curative and polyepoxide as shown in Table 1 and the methods described above in "General Preparation Methods", except that a 3.8 liter (1.0 gallon) can was used to carry out the dissolution of the fluorene amine curative. These materials were tested as described above, and the results are shown in Table 1.

Comparative Example 1: 0% Melt Dissolved

A resin composition and resin transfer film were prepared using the types and amounts of curative and polyepoxide as shown in Table 1 and the methods described above in "General Preparation Methods", except that none of the powdered fluorene amine was dissolved in the polyepoxide component. The structural integrity of the resin composition was too low to permit preparation of curable prepreg material for testing or conversion to a cured composite. As a result, only the initial resin Tg value was measured as shown in Table 1.

Comparative Example 2: 100% Melt Dissolved

A curable resin composition, resin transfer film, prepreg, and cured composite were prepared using the types and amounts of curative and polyepoxide as shown in Table 1 and the methods described above in "General Preparation Methods", except that all of the powdered fluorene amine was dissolved in the polyepoxide component. The samples were tested using the procedures described above. Results are shown in Table 1.

Comparative Example 3: 100% Melt Dissolved

A resin composition was prepared using the types and amounts of curative and polyepoxide as shown in Table 1 and the methods described above in "General Preparation Methods, except that all of the powdered fluorene amine was dissolved in the polyepoxide component, a 0.4 liter (1 pint) metal can was used to carry out dissolution of the fluorene amine curative powder, and only a resin composition was prepared. The test results are shown in Table 1.

from 40% to 80% to achieve a desirable combination of tack, cured laminate Tg, and resin migration characteristics.

Examples 10–13

A series of curable resin compositions, resin transfer films, prepregs, and cured composite laminates were prepared using the types and amounts of curative and polyepoxide as shown in Table 2. As can be seen from Table 2, the polyepoxide of these examples comprised a mixture of D.E.R.™ 332 and FEP (a solid polyepoxide): The materials were prepared as follows:

FEP was first dissolved in the D.E.R.™ 332 prior to dissolving any fluorene amine curative powder. This was done by weighing the two polyepoxide components into a 3.8 liter (1.0 gallon) metal can and heating to 107° C. (225° F.) using a hot plate while stirring with an overhead air

TABLE 1

| Ex. | D.E.R™ 332 (g) | EPON™ DPL-862 (g) | Dissolved CAF (g) | Dissloved CAF (wt % of total CAF) | Dispersed CAF (g) | DSC Initial Resin Tg (° C.) | Prepreg Tack | RDA Cured Composite Tg (° C.) | Resin Migration |
|---|---|---|---|---|---|---|---|---|---|
| C1 | 554.9 | 0 | 0 | 0 | 445.2 | −16.4 | N/M* | N/M* | N/M* |
| 1 | 554.9 | 0 | 89.0 | 20 | 356.1 | −12.5 | None | 176 | Low |
| 2 | 55.5 | 0 | 13.4 | 30 | 31.2 | −9.6 | N/M | N/M | N/M |
| 3 | 554.9 | 0 | 178.1 | 40 | 267.1 | −5.0 | Poor | 184 | Low |
| 4 | 55.5 | 0 | 22.3 | 50 | 22.3 | −0.7 | N/M | N/M | N/M |
| 5 | 554.9 | 0 | 267.1 | 60 | 178.1 | 3.2 | Good | 183 | None |
| 6 | 55.5 | 0 | 31.2 | 70 | 13.4 | 7.1 | N/M | N/M | N/M |
| 7 | 554.9 | 0 | 356.1 | 80 | 89.0 | 10.7 | Good | 182 | None |
| 8 | 55.5 | 0 | 40.1 | 90 | 4.5 | 14.6 | N/M | N/M | N/M |
| C2 | 554.9 | 0 | 445.1 | 100 | 0 | 17.5 | None | 188 | None |
| 9 | 0 | 1098.3 | 450.9 | 50 | 450.9 | −3.3 | Slight | 149 | High |
| C3 | 0 | 109.8 | 90.2 | 100 | 0 | 18.1 | N/M | N/M | N/M |

N/M: not measured (no prepreg was made)
*structural integrity of sample was too low to permit prepreg preparation
Note: The RDA Tg for the cured neat resin corresponding to Examples 1–8, C1 and C2 was 186° C., while the RDA Tg for the cured neat resin corresponding to Examples 9 and C3 was 156° C.

Discussion of Results of Table 1

The results in Table 1 show that when the fluorene amine curative is partly melt-dissolved and partly dispersed into the polyepoxide, the properties of the prepreg and the cured composite surprisingly improve compared to systems where the curative is either all dispersed or all melt dissolved. The resin composition of C1 (0% melt dissolved) lacked sufficient structural integrity for preparation of a prepreg that could be tested or converted to a cured composite. C2 provided a prepreg that was brittle. In addition, the data corresponding to C2 and C3 show that when the fluorene amine is completely dissolved, the tack characteristics of the prepreg are not acceptable as shown by glass transition temperatures greater than 15° C.

As the amount of melt dissolved curative is increased, the problem associated with C1 is overcome, and prepreg having improved tack with glass transition values of less than 15° C. is provided. Furthermore, the prepreg provides cured composites having a resin migration rating of "Low" to "None" and cured glass transition temperatures that are comparable (i.e., within 10 degrees C.) to the cured neat resin glass transition temperature.

From this data, it can be concluded that when the epoxy resin composition comprises D.E.R.™ 332 and CAF, the preferred amount of dissolved curative is in the range of stirrer fitted with a three-pronged mixing blade. Heating and stirring was continued until a homogenous, single phase liquid resin was obtained. The temperature of the D.E.R.™ 1332/FEP mixture was then increased to 149° C. (300° F.) with continuous stirring, at which time a portion of the fluorene amine curative powder was added in a single charge with continuous stirring. The stirring was continued until all the curative dissolved to give a homogenous, single phase liquid resin. The addition and dispersal of the remaining amount of fluorene amine curative was conducted in the same manner as described above in the "General Preparation Methods, General Preparation of Resin Compositions". Resin transfer films, prepregs, and cured composites were also prepared using the procedures described above in the "General Preparation Methods". The compositions and test results for these resins, prepregs, and composites are shown in Table 2.

Comparative Example 4: 0% Melt Dissolved

A curable resin composition, resin transfer film, prepreg, and cured composite were prepared as described above for Examples 10–13 except that none of the fluorene amine curative powder was dissolved. The composition and test results are shown in Table 2.

TABLE 2

| Ex. | D.E.R ™ 332 (g) | FEP (g) | Dissolved CAF (g) | Dissloved CAF (wt % of total CAF) | Dispersed CAF (g) | DSC Initial Resin Tg (° C.) | Prepreg Tack | RDA Cured Composite Tg (° C.) | Resin Migration |
|---|---|---|---|---|---|---|---|---|---|
| C4 | 861.0 | 287.0 | 0 | 0 | 852.0 | −5.7 | Poor | 187 | High |
| 10 | 861.0 | 287.0 | 85.2 | 10 | 766.8 | −5.5 | Slight | 190 | High |
| 11 | 861.0 | 287.0 | 170.4 | 20 | 681.6 | −0.3 | Slight | 188 | Low |
| 12 | 861.0 | 287.0 | 255.6 | 30 | 596.4 | 5.4 | Good | 186 | Low |
| 13 | 861.0 | 287.0 | 340.8 | 40 | 511.2 | 9.4 | Good | 190 | Low |

Note: The RDA Tg of the cured neat resin corresponding to Examples 10–13 and C4 was 187° C.

Discussion of the Results of Table 2

The results in Table 2 show when a portion of the fluorene amine curative powder is predissolved in the resin compositions, a desirable combination of tack, cured laminat Tg, and resin migration characteristics may be achieved. More specifically, prepreg tack improves from "poor" to "slight" to "good" as the amount of melt dissolved curative is increased from 0% to 10% to 30%. The data also show that when the epoxy resin composition comprises D.E.R.™ 332, FEP, and CAF, the amount of melt dissolved curative is preferably from 30 to 40% to achieve a desirable balance of tack, cured laminate Tg, and resin migration characteristics.

AGING CHARACTERISTICS

The minimum viscosity of the curable resin compositions of Examples 3, 6, 9 and 13 were evaluated using the procedure as described above at the time they were prepared and several weeks later in order to evaluate their room temperature stability, i.e., characteristics. The results are shown in Table 3.

TABLE 3

| Example (#) | Time (days) | Viscosity Minimum (Poise) |
|---|---|---|
| 3 | 0 | 0.3 |
| 3 | 65 | 0.4 |
| 6 | 0 | 0.8 |
| 6 | 28 | 2.2 |
| 9 | 0 | 0.4 |
| 9 | 46 | 2.8 |
| 13 | 0 | 0.4 |
| 13 | 35 | 0.8 |

The results in Table 3 show that when 40 to 70% of the fluorene amine curative powder is predissolved in the resin composition it retains its viscosity characteristics even after 65 days at room temperature. This allows for the provision of prepreg which can be layed up on a tool and allowed to sit at room temperature for a length of time (for example, 60 days) prior to cure without any requirements for special storage conditions.

We claim:

1. A curable epoxy resin composition coated onto a release liner comprising:
   (a) at least one aromatic polyepoxide compound having at least two 1,2-epoxide groups; and
   (b) at least one 9,9-bis(4-aminophenyl)fluorene amine curative, wherein:
      (i) at least 10% by weight of said fluorene amine curative is heat dissolved in said aromatic polyepoxide, based on the total amount of fluorene amine curative used; and
      (ii) at least a portion of said fluorene amine curative is dispersed as a solid therein;

wherein the combination of (a) and (b)(i) forms a homogeneous single phase resin having an initial resin glass transition temperature of less than or equal to 15° C., measured by differential scanning calorimetry at a heating rate of 10° C./minute.

2. A curable epoxy resin composition according to claim 1 that is solvent-free.

3. A curable epoxy resin composition according to claim 1 wherein the amount of fluorene amine curative that is heat dissolved in said aromatic polyepoxide is in the range of from 10 to 90 percent by weight based on the total amount of fluorene amine curative used.

4. A curable epoxy resin composition according to claim 1 wherein the amount of fluorene amine curative that is heat dissolved in said aromatic polyepoxide is in the range of from 30 to 80 percent by weight based on the total amount of fluorene amine curative used.

5. A curable epoxy resin composition according to claim 1 wherein the amount of fluorene amine curative that is heat dissolved in said aromatic polyepoxide is in the range of from 40 to 70 percent by weight based on the total amount of fluorene amine curative used.

6. A curable epoxy resin composition according to claim 1 wherein the initial glass transition temperature of said epoxy resin composition is in the range of from −5° C. to 10° C.

7. A curable epoxy resin composition according to claim 1 wherein the initial glass transition temperature of said epoxy resin composition is in the range of from 0° C. and 10° C.

8. A curable epoxy resin composition according to claim 1 wherein said aromatic polyepoxide is selected from the group consisting of the polyglycidyl ethers of 4,4'-dihydroxydiphenyl methane, 2,2-bis(4-hydroxyphenyl) propane, and 9,9-bis(4-hydroxyphenyl)fluorene.

9. A curable epoxy resin composition according to claim 1 wherein said curative is present in an amount sufficient to provide 1.0 to 2.0 moles of amino-hydrogen groups per mole of epoxide groups.

10. A curable epoxy resin composition according to claim 1 wherein said curative is present in an amount sufficient to provide 1.2 to 1.65 moles of amino-hydrogen groups per mole of epoxide groups.

11. A curable epoxy resin composition according to claim 1 wherein said curative is selected from the group consisting of 9,9-bis(3-methyl-4-aminophenyl)fluorene; 9,9-bis(3-ethyl-4-aminophenyl)fluorene; 9,9-bis(3-phenyl-4-aminophenyl)fluorene; 9,9-bis(3,5-dimethyl-4-aminophenyl)fluorene; 9-(3,5-diethyl-4-aminophenyl)-9-(3-methyl-4-aminophenyl)fluorene; 9-(3-methyl-4-aminophenyl)-9-(3-chloro-4-aminophenyl)fluorene; 9,9-bis (3,5-diisopropyl-4-aminophenyl)fluorene; and 9,9-bis(3-chloro-4-aminophenyl)fluorene.

12. A curable epoxy resin composition according to claim 1 having a minimum viscosity in the range of from 0.3 to 30 poise measured by a dynamic mechanical analyzer in a parallel plate mode using a frequency of 100 radians/second at a heating rate of 2° C./minute.

13. A curable epoxy resin composition according to claim 1 having a viscosity in the range of from 10 to 30 poise, at a temperature less than 110° C., wherein the minimum viscosity is measured by a dynamic mechanical analyzer in a parallel plate mode using a frequency of 100 radians/second at a heating rate of 2° C./minute.

14. A curable epoxy resin composition according to claim 1 additionally comprising adjuvants.

* * * * *